Patented Oct. 19, 1937

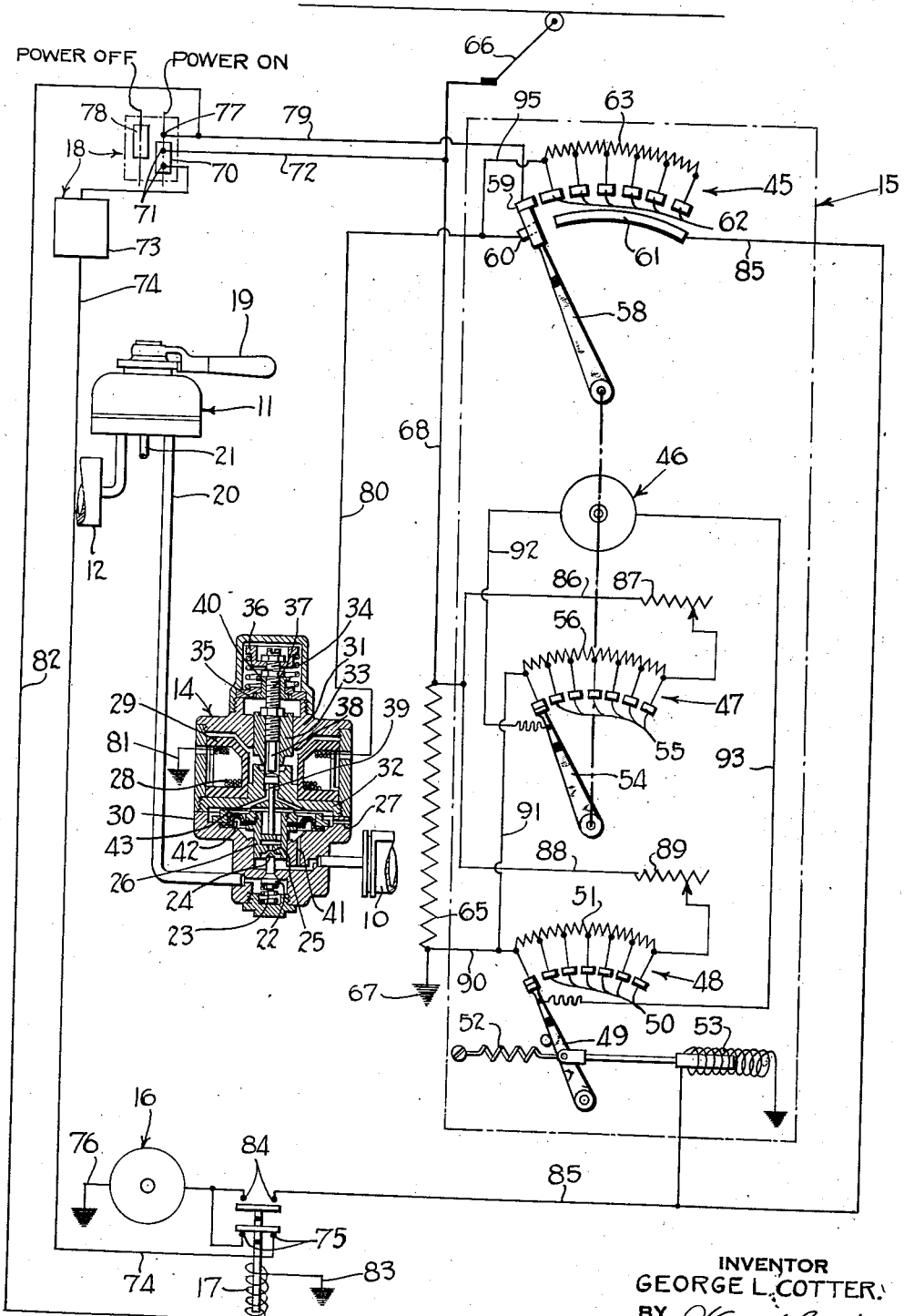

2,096,480

UNITED STATES PATENT OFFICE 2,096,480

ELECTROPNEUMATIC BRAKE

George L. Cotter, Forest Hills, Pa., assignor to The Westinghouse Air Brake Company, Wilmerding, Pa., a corporation of Pennsylvania Application February 1, 1936, Serial No. 61,944

16 Claims. (Cl. 303—21)

This invention relates to electro-pneumatic brakes, and more particularly to electro-pneumatic means for controlling the degree of application of the brakes upon a tendency of the vehicle wheels to slide.

It is a well known fact that if the brakes on a vehicle are applied to a degree exceeding that permitted by the adhesion between the wheels and rail the wheels will slide. Wheel sliding is objectionable in that flat places are worn on the wheel treads, thereby rendering them unfit for regular service, and because the retarding force of sliding wheels is much less than that of rolling wheels. Consequently, when wheels slide the vehicle cannot be stopped in the shortest possible distance.

It is also a well known fact that the rolling friction between vehicle wheels and track rails is substantially constant throughout all ordinary ranges of speed. Therefore, if the brakes are initially applied to a degree just below the wheel slipping point, and this degree of application maintained throughout the deceleration period, the vehicle will be decelerated at a constant rate of retardation. If an attempt is made to secure a higher rate of retardation wheel sliding may result.

If when the wheels just commence to slip the braking force applied to these wheels be diminished rapidly enough, then the wheels may not reach a locked wheel stage, and may return again to normal speed. It is, therefore, highly desirable that during the incipient stage of wheel sliding the brakes on sliding wheels be released fast enough to prevent locked wheels, and to permit the wheels to roll again at normal speed.

In carrying out my invention I contemplate a means for correcting wheel sliding in the incipient stage, which means is operated by and in response to the counter electromotive force of one or more vehicle motors. A principal object of my invention, therefore, is to provide a wheel sliding correcting means which functions in response to the counter electromotive force produced by one or more vehicle motors.

In many types of vehicle designs a driving motor is associated with each vehicle axle, or pairs of wheels. In carrying out my invention I contemplate the provision of means for releasing the brakes on each axle or pairs of wheels when either of, or both, wheels commence to slide. It is, therefore, a further principal object of the present invention to provide a wheel sliding correcting means which will operate to correct the sliding of any one or both of a pair of wheels, independent of any means supplied to similarly correct wheel sliding on any other wheel or pairs of wheels.

Further objects of my invention, dealing with specific constructions and arrangements of parts for carrying out more specific objects to be hereinafter referred to, will be understood from the following description, which is taken in connection with the single figure of the attached drawing, wherein an embodiment of the invention is shown in schematic and diagrammatic form for a single vehicle.

Referring now to this drawing, I have shown a simple fluid pressure brake system comprising a brake cylinder 10, a brake valve device 11, and a reservoir 12.

For correcting wheel sliding in the incipient stage I have provided a magnet valve device 14, and a control mechanism 15 therefor, which control mechanism is operated by the counter electromotive force supplied by a vehicle driving motor indicated diagrammatically at 16.

A relay 17 and a power controller indicated diagrammatically at 18 serve to connect the motor 16 to a trolley circuit or to the control mechanism 15.

In order to simplify the explanation of the invention, I have shown only one brake cylinder 10 and one vehicle driving motor 16, but it will be apparent as the description proceeds that any number of these devices may be employed in association, as will be described.

The brake valve device 11 may be one of the usual rotary types, and for the particular embodiment depicted it will be assumed that when the brake valve handle 19 is in release position the valve device connects a brake application pipe 20 to an exhaust pipe 21; when in application position interrupts this communication and connects the brake application pipe 20 to the reservoir 12, and when in lap position blanks the communication to the brake application pipe 20, as is usual in rotary valves of this type.

The reservoir 12 will of course be connected to a suitable type of compressor (not shown) and maintained charged to a suitable pressure value.

The magnet valve device 14 is preferably of the self-lapping type, being embodied in a casing and having a supply valve 22 urged toward a seated position by spring 23. The stem of the supply valve 22 terminates in a release valve 24 which coacts with a seat 25 formed in a movable member 26.

When the release valve 24 is seated and supply valve 25 is unseated, fluid under pressure may flow from the application pipe 20 to the brake cylinder 10. When the supply valve 22 is seated and the release valve 24 unseated, fluid under pressure is released from the brake cylinder 10 past the unseated release valve 24 and through exhaust port 27 to the atmosphere.

The release valve 24 is seated and the supply valve 22 is unseated by the downward movement of the movable member 26. This member is moved downward upon energization of a winding 28 disposed in an insulating covering 29. The winding 28 is surrounded by a magnetic casing 30 and magnetic end members 31 and 32, which form part of a magnetic circuit for flux produced by the winding. Mounted in the end member 31 is a movable core 33, which is attracted downwardly against opposition of a spring 34 upon energization of the winding 28.

The spring 34 is disposed in an upper portion of the valve device casing between a retaining member 35 and a spring washer 36, which is secured to a stem 37 screwed into the core 33. The spring 34 biases the core 33 to an uppermost position, and when the winding 28 is energized the resulting magnetism attracts the core 33 downwardly, whereupon the end 38 of the stem 37 engages a pin 39 to actuate the movable member 26 downwardly.

The downmost movement of the core 33 is reached when the upper flange of a collar 40 engages the top surface of the retaining member 35. When this limit of downward movement has been reached, the movable member 26 will have been actuated downwardly far enough to first seat the release valve 24 and to then open wide the supply valve 22. Intermediate these extreme positions the core 33 will assume various other positions dependent upon the degree of energization of the winding 28.

When the release valve 24 is seated and the supply valve 22 is unseated, fluid under pressure flows to the brake cylinder 10 and also flows through passage 41 to chamber 42 below a diaphragm 43 secured to and carrying the movable member 26. The diaphragm 43 is so designed as to normally hold the movable member 26 in the position illustrated, and is deflected downwardly when energization of winding 29 actuates the pin 39 downwardly. When the pressure below the diaphragm 43, due to the supply of fluid under pressure to the brake cylinder 10, overbalances the pressure acting above the diaphragm due to energization of the winding 28, the movable member 26 will move upwardly until spring 23 seats supply valve 22. The supply of fluid under pressure to the brake cylinder 10 will then be lapped.

If the energization of winding 28 is thereafter diminished, the overbalancing pressure below diaphragm 43 will actuate it upwardly and thus unseat release valve 24, to release fluid under pressure from the brake cylinder until an equalization of the pressure acting above and below the diaphragm 43 is reached. It will be obvious, therefore, that the degree of pressure established in the brake cylinder 10 corresponds to the degree of energization of the winding 28.

The control mechanism 15 comprises a magnet valve rheostat section 45, a control motor 46, an auxiliary rheostat section 47, and a primary rheostat section 48.

The primary rheostat section 48 comprises an arm 49 which may be actuated to various positions to engage each of a plurality of contact segments 50, for the purpose of cutting in or out of a circuit to be described portions of a resistance 51. The arm 49 is biased to the illustrated position by a spring 52, and is actuated to the right a distance dependent upon the degree of energization of an electromagnet 53.

The auxiliary rheostat section 47 comprises an arm 54, also movable in a clockwise direction to engage each of a plurality of contacts 55, to cut in or out of a circuit portions of resistance 56.

The magnet valve rheostat section 45 also includes an arm 58, which in its extreme left hand position connects together contact segments 59 and 60, and which upon movement in a clockwise direction connects a segmental contact 61 selectively to each of a plurality of contacts 62, for the purpose of cutting out of circuit portions of a resistance 63. The two arms 54 and 58 are rigidly secured to and movable with the shaft of the control motor 46, as is diagrammatically indicated in the drawing. Therefore, as motor 46 rotates in either a clockwise or a counter-clockwise direction the two arms 54 and 58 will rotate with it.

To operate the control mechanism 15 properly a source of current supply must be available, and this source is provided in the form of a resistance device 65 connected between a trolley 66 and a ground connection 67 by a trolley conductor 68. The manner in which the resistance device 65 supplies current to operate the control mechanism, and the details of the circuits connected thereto, will be more fully described in the description of operation of this embodiment, which now follows.

Assuming that the embodiment illustrated is installed on a vehicle, when the vehicle is running under power the operator will have rotated the power controller handle (not shown) to some power position. The power controller has been illustrated only diagrammatically at 18, and only such parts as are pertinent to the present invention have been shown in detail.

When the power controller handle is in power position, a contact 70 will be in engagement with two contact fingers 71, to establish a circuit from the trolley conductor 68 to the vehicle driving motor 16, by way of conductor 72, contacts 70 and 71, the current regulating portion 73 of the power controller 18, conductor 74, now closed contacts 75 of relay 17, the vehicle motor 16, and ground connection 76. Power will then be supplied to the motor 16 according to the operation of the motor controller 18.

With the power controller handle in power position, the parts of the equipment illustrated will be in the positions as indicated in the drawing. Referring to the control mechanism 15, it will be observed that the upper terminal of the resistance device 65 is connected by conductor 86 and variable resistance 87 to the right hand end of resistance 56, and by conductor 88 and variable resistance 89 to the right hand end of resistance 51.

The lower terminal of the resistance device 65 is connected by conductors 90 and 91 to the left hand end of resistance 56, and by conductor 90 to the left hand end of resistance 51. The rheostat arm 54 is connected by conductor 92 to one terminal of the control motor 46, while the arm 49 is connected by conductor 93 to the other terminal of the control motor 46. For the positions of the two arms 49 and 54 as illustrated no current will flow to the control motor 46, so that the rheostat arms 54 and 58 will remain in the positions illustrated.

When it is desired to effect an application of the brakes, the power controller handle is first moved to the off position. In this position of the power controller handle, contact 70 disengages from contact fingers 71, while contact 78 connects the uppermost contact finger 71 to another contact finger 77. This connects both relay 17 and the magnet valve device 14 to the trolley 66.

The circuit to the relay 17 includes, beginning from trolley conductor 68, conductor 72, the top contact finger 71, bridging contact 78, contact finger 77, conductor 82, relay 17, and ground connection 83. The circuit to the magnet valve device 14 includes, beginning at contact finger 77, conductor 79, contacts 59 and 60, (and arm 58 of magnet valve rheostat portion 45), conductor 80, winding 28, and ground connection 81.

The relay 17 will be then energized to open contacts 75 and close contacts 84, while the energization of winding 28 in the magnet valve device will seat release valve 24 and shift supply valve 22 to full unseated position, thus opening wide communication from the application pipe 20 to the brake cylinder 10.

The operator then turns the brake valve handle 19 to application position to supply fluid under pressure from the reservoir 12 to the brake cylinder 10, to effect an application of the brakes.

Opening of the relay contacts 75 isolates the vehicle motor 16 from the power controller. Closing of contacts 84 connects the electromagnet 53, of the primary rheostat section 48, to the vehicle motor 16. Current then flows to the electromagnet 53 and the arm 49 is actuated in a clockwise direction to a position dependent upon the degree of energization of the electromagnet.

Assuming that the arm is actuated to the extreme clockwise position, the balance normally obtaining between the two rheostat sections 47 and 48 is destroyed, and current now flows from the upper terminal of resistance device 65, through conductor 88, resistance 89, the extreme right hand contact 50, arm 49, and conductor 93 to the control motor 46, returning by way of conductor 92, arm 54, the extreme left hand contact 55, and conductors 91 and 90 to the lower terminal of resistance 65. Flow of current through the control motor 46 in this direction causes the control motor to rotate in a clockwise direction, and thus carry the two arms 54 and 58 with it.

As arm 58 moves in a clockwise direction it disconnects the magnet valve winding 28 from the trolley 66, and connects this winding to the vehicle motor 16, by way of conductors 80 and 95, resistance 63, a contact 62, contact segment 61, and conductor 85. The magnet valve winding 28 is thus energized by the counter electromotive force of the vehicle motor 16.

As the arm 54 rotates in a clockwise direction and engages the extreme right hand contact 55, it will be observed that current will tend to flow from the upper terminal of resistance device 65, through conductor 86, resistance 87, the extreme right hand contact 55, arm 54, and conductor 92 to the control motor 46, and in direct opposition to the current flowing from the primary rheostat section 48 to the control motor.

The variable resistances 87 and 89 are made alike and so adjusted that as the arm 54 engages the extreme right hand contact 55, the oppositely flowing currents to the control motor 46 balance and the control motor then comes to rest, with the rheostat arm 58 in a position corresponding to the positions of the two arms 54 and 49. The magnet valve winding 28 is then connected to the vehicle motor 16 with all of the resistance 63 in series therewith.

As the speed of the vehicle diminishes due to application of the brakes, the counter electromotive force of the motor 16 will diminish and the pull exerted by electromagnet 53 will decrease so that spring 52 will gradually rotate the arm 49 in a counter-clockwise direction. In a manner similar to that just described for clockwise rotation, the arms 54 and 58 will follow the arm 49, the arm 58 gradually cutting out portions of resistance 63.

Now the parts are so designed that as long as the decrease of the counter electromotive force produced by vehicle motor 16 occurs at or below a critical rate corresponding to a rate of deceleration below the wheel slipping point, for a given set of track conditions, the resistance 63 will be cut out of circuit fast enough to maintain the winding 28 energized to a substantially constant degree. The communication from the brake valve device 11 to the brake cylinder 10 will be then maintained open, so that the degree of application of brakes may be varied by manipulation of the brake valve handle 19.

If now as the speed of the vehicle diminishes a wheel (or both wheels) associated with the motor 16 should commence to slip, so that the speed of rotation of motor 16 diminishes at a rate faster than that corresponding to the critical rate, then the counter electromotive force will correspondingly diminish. Energization of electromagnet 53 will correspondingly decrease and spring 52 will cause a sudden movement of the arm 49 to the left.

At the same time, since winding 28 is connected directly to the motor 16, the energization of this winding will also suddenly decrease, so that the supply valve 22 will be seated and release valve 24 unseated. Fluid under pressure will be then released from the brake cylinder 10 rapidly enough to permit the slipping wheel to pick up speed and again rotate at normal. When this takes place the pull exerted by the electromagnet 53 will increase and arm 49 will move to the right.

During the quick movement of the arm 49 to the left, current was again supplied to the motor 46 to cause it to rotate in the counter-clockwise direction. This motor is preferably of the damped or slow response type, so that an interval of time will elapse before the arms 54 and 58 will assume the position of the arm 49. During this interval of time fluid under pressure is released from the brake cylinder 10, and it is intended that this release shall take place at a rate such that before arms 54 and 58 have moved very far to the left, the slipping wheel will have picked up speed again and will in all probability be rotating at normal speed.

If the arms 54 and 58 were to follow the arm 49 as rapidly as this latter arm moved when the wheel commenced to slip, then it is possible that the amount of the resistance 63 in circuit would be decreased at the same rate as the decrease of electromotive force, so that winding 28 would remain fully energized and no release from the brake cylinder would take place. The wheel slipping condition would then be aggravated and sliding of the wheels would undoubtedly result. By making the arms 54 and 58 respond somewhat slowly to the movement of the arm 49, the release can be effected without producing sliding of the wheels.

As the slipping wheel picks up speed again and all three arms return to coincidental positions, the brakes on the wheel are again applied, so that the maximum retarding effort is produced to stop the vehicle. Of course, if the slipping should again occur the cycle as just described will be repeated.

As the vehicle slows down and reaches some predetermined low speed the electromotive force will be so low that the pull due to the electromagnet 53 will be entirely overcome by spring 52 and arm 49 will return to the illustrated position. Arm 58 will then also return to its illustrated position, in which the magnet valve device 14 is disconnected from the vehicle motor 16 and reconnected to the trolley 66. This insures maintaining the communication between the brake valve device 11 and the brake cylinder 10 open so as to permit the operator to maintain sufficient brake cylinder pressure to bring the vehicle to a stop. Thereafter the operator may release the brakes by manipulation of the brake valve handle 19.

While I have illustrated my invention in connection with one embodiment thereof, it is not my intention to be limited to this embodiment or otherwise than by the spirit and scope of the appended claims.

Having now described my invention, what I claim as new and desire to secure by Letters Patent, is:

1. In a vehicle brake system, in combination, a brake cylinder, means for effecting a supply of fluid under pressure to said brake cylinder, an electrically operated valve device operable to limit the degree of brake cylinder pressure according to the degree of energization thereof and operated upon a sudden decrease in energization thereof to effect a release of fluid under pressure from said brake cylinder, and means for maintaining said electrically operated valve device normally energized at a substantially constant value, regardless of changes in vehicle speed, during a brake application and for suddenly decreasing the energization thereof upon slipping or sliding of a vehicle wheel.

2. In a vehicle brake system, in combination, fluid pressure brake means, means for opening a communication through which fluid under pressure is supplied in effecting an operation of said brake means, a magnet valve device disposed in said communication and operable to limit the degree of fluid under pressure supplied through said communication according to the degree of energization thereof, and operable upon a sudden decrease in the energization thereof to effect a release of fluid under pressure from said communication, and means for maintaining said magnet valve device energized to a substantially constant degree when no vehicle wheels are slipping or sliding, regardless of changes in vehicle speed, and for suddenly decreasing the energization of changes in vehicle speed, until one or more wheels slip or slide.

3. In a vehicle brake system, in combination, fluid pressure brake means, means for establishing a communication through which fluid under pressure is supplied to effect an operation of said brake means, a magnet valve device disposed in said communication and operable to limit the degree of fluid under pressure supplied through said communication according to the degree of energization thereof, and means for maintaining said magnet valve device energized at a substantially constant current value, regardless of changes in vehicle speed, until one or more wheels commence to slide.

4. In a vehicle brake system, in combination, brake means, means for effecting an operation of said brake means, an element adapted to be progressively positioned according to the speed of the vehicle, a second element adapted to be positioned according to said first element, and electro-responsive means governed by the positions of both of said elements for controlling the operation of said brake means.

5. In a vehicle brake system, in combination, brake means, means for effecting an application operation of said brake means, a first element adapted to be positioned according to the speed of the vehicle, a second element adapted to be positioned according to the position of said first element with a delayed movement, and means controlled according to the position of both of said elements for controlling the application operation of said brake means, and operated upon a lag in the movement of said second element behind the movement of said first element for effecting a decrease in the degree of operation of said brake means.

6. In a vehicle brake system, in combination, brake means, means for reflecting an application operation of said brake means, a first positionable element, a second positionable element, means for positioning said first element according to the speed of the vehicle, means for positioning said second element according to the position of said first element, and means operable when the positions of said two elements correspond to limit the degree of application operation of said brake means, and operable at a chosen time when the positions of said two elements do not correspond for effecting a release operation of said brake means.

7. In a vehicle brake system, in combination, brake means, means for effecting an application operation of said brake means, an electric generator, control means having an arm positionable according to the electromotive force produced by said generator, electro-responsive means for controlling operation of said brake means according to the energization thereof, a rheostat device having an arm and being operable to control the energization of said electro-responsive means according to the movement of its arm, and means for causing the arm of said rheostat device to follow the positioning of the arm of said control means.

8. In a vehicle brake system, in combination, brake means, means for effecting an application operation of said brake means, an electro-responsive device operable to limit the degree of operation of said brake means according to the degree of energization thereof, and operable upon a sudden decrease in energization thereof to effect a release operation of said brake means, means for producing an electromotive force which diminishes as the speed of the vehicle diminishes, control means having an element positionable according to the degree of said electromotive force, and means for energizing said electro-responsive device by said electromotive force and for suddenly decreasing the energization of said device upon a sudden movement of said element due to slipping or sliding of a vehicle wheel.

9. In a vehicle brake system, in combination, brake means, means for effecting an application operation of said brake means, electro-responsive means operable to limit the degree of operation of said brake means according to the degree of energization thereof, a vehicle motor operable when driven by motion of the vehicle to produce an electromotive force related to the speed of the vehicle, and means operated by said electromotive force for maintaining said electro-responsive means energized to a substantially constant degree as the speed of said vehicle diminishes, and operable upon sliding of a vehicle wheel associated with said motor for decreasing the energization of said electro-responsive means.

10. In a vehicle brake system, in combination, a brake cylinder, means for establishing a communication through which fluid under pressure is supplied to said brake cylinder, a magnet valve device in said communication and operable to limit the degree of brake cylinder pressure according to the degree of energization thereof, an electric motor adapted when driven by motion of the vehicle to produce an electromotive force related to the speed of the vehicle, control means having an arm positioned according to the electromotive force produced by said motor, a rheostat device having an arm for controlling the degree of energization of said magnet valve device, means for moving said rheostat arm in accordance with the movement of said control means arm and operable upon a sudden decrease in the electromotive force produced by said motor for effecting a corresponding decrease in the energization of said magnet valve device.

11. In a vehicle brake system, in combination, brake means, electro-responsive means for controlling the degree of operation of said brake means, means for producing an electro-motive force related to the speed of the vehicle, a trolley circuit adapted to be connected to a trolley to supply current for operating purposes, and means for energizing said electro-responsive means by said electromotive force until the speed of the vehicle diminishes to a predetermined value and for then energizing said electro-responsive means by current from said trolley circuit.

12. In a vehicle brake system, in combination, brake means, electro-responsive means operable to control the degree of operation of said brake means according to the degree of energization thereof, a circuit for supplying current to said electro-responsive means, a motor operable when connected to a source of power supply to propel the vehicle, and operable when disconnected from said source of power supply and connected to said circuit to supply current to said electro-responsive means, contacts operable in one of two positions to connect said motor to said source of power supply, and in the other of said two positions to disconnect said motor from said source of power supply and to reconnect said motor to said circuit to said electro-responsive means, and means for actuating said contacts between said two positions.

13. In a vehicle brake system, in combination, a brake cylinder, means for effecting a supply of fluid under pressure to said brake cylinder, valve means for regulating brake cylinder pressure, a winding, a movable abutment subject on one side to fluid at brake cylinder pressure and on the other side to a magnetic force produced by energization of said winding, said abutment being adapted to control the operation of said valve means to regulate brake cylinder pressure according to the degree of energization of said winding, and means for controlling the energization of said winding and operable to reduce the energization thereof when a wheel or wheels associated with said brake cylinder begin to slip, but operable to maintain under varying speeds the degree of energization of said winding substantially constant so long as said wheel or wheels do not slip.

14. In a vehicle brake system, in combination, a brake cylinder, means for effecting a supply of fluid under pressure to said brake cylinder, valve means for regulating brake cylinder pressure, an electromagnet, a movable abutment subject on one side to fluid at brake cylinder pressure and on the other side to magnetic forces produced by energization of said electromagnet, said movable abutment being adapted to control the operation of said valve means, a control element adapted to be moved between a plurality of positions, and means governed by the rate of movement of said element for controlling the degree of energization of said electromagnet.

15. In a vehicle brake system, in combination, a brake cylinder, means for effecting a supply of fluid under pressure to said brake cylinder, valve means for regulating brake cylinder pressure, an electromagnet, a movable abutment subject on one side to fluid at brake cylinder pressure and on the other side to magnetic forces produced by energization of said electromagnet, said movable abutment being adapted to control the operation of said valve means, a control element movable between a plurality of positions, and means operable to maintain said electromagnet energized to a substantially constant degree so long as the movement of said arm takes place at or below a given rate, but operable to diminish the degree of energization of said electromagnet when the rate of movement of said arm exceeds said given rate.

16. In a vehicle brake system, in combination, a brake cylinder, means for effecting a supply of fluid under pressure to said brake cylinder, electrically controlled valve means having an electromagnet and a movable abutment so arranged that brake cylinder pressure is regulated according to the degree of energization of said electromagnet, and operable to increase or decrease brake cylinder pressure as the energization of said electromagnet is increased or decreased, a positionable arm, electrical means for positioning said arm according to the degree of current supplied thereto, and means for maintaining said electromagnet in said electrically controlled valve means energized to a substantially constant degree so long as said arm is positioned gradually and being operable to reduce the degree of energization of said electromagnet when said arm is moved quickly.

GEORGE L. COTTER.

CERTIFICATE OF CORRECTION.

Patent No. 2,096,480.  October 19, 1937.

GEORGE L. COTTER.

It is hereby certified that error appears in the printed specification of the above numbered patent requiring correction as follows: Page 4, first column, line 54, claim 2, strike out the words "changes in vehicle speed, until" and insert instead said magnet valve device when; and that the said Letters Patent should be read with this correction therein that the same may conform to the record of the case in the Patent Office.

Signed and sealed this 18th day of January, A. D. 1938.

(Seal)

Henry Van Arsdale,
Acting Commissioner of Patents.